United States Patent [19]

Joy

[11] 4,244,188
[45] Jan. 13, 1981

[54] METHANOL FUELED SPARK IGNITION ENGINE

[75] Inventor: John R. Joy, Brighton, Mich.

[73] Assignee: Williams Research Corporation, Walled Lake, Mich.

[21] Appl. No.: 66,458

[22] Filed: Aug. 14, 1979

[51] Int. Cl.³ .......................... F02G 3/00; F02B 43/08
[52] U.S. Cl. ...................................... 60/624; 60/618; 123/3
[58] Field of Search ................ 60/624, 618, 614, 597; 123/3

[56] References Cited

U.S. PATENT DOCUMENTS

| | | | |
|---|---|---|---|
| 3,224,186 | 12/1965 | Wood | 60/624 |
| 4,003,204 | 1/1977 | Bradley | 60/618 |
| 4,087,974 | 5/1978 | Vaughn | 60/624 X |
| 4,122,802 | 10/1978 | Noguchi et al. | 123/3 |

*Primary Examiner*—Wendell E. Burns
*Attorney, Agent, or Firm*—Harness, Dickey & Pierce

[57] ABSTRACT

Methanol is delivered by a fuel pump to a reformer at a relatively high pressure, where it is heated by exhaust gases from a spark ignition engine and decomposed over a catalyst bed to form carbon dioxide and hydrogen, this being a constant pressure process. The mixture is fed to an auxiliary turbine which helps drive the output shaft of the spark ignition engine. The low pressure exhaust gases from the auxiliary turbine are mixed with air and fed to a spark ignition engine where they are combusted.

2 Claims, 1 Drawing Figure

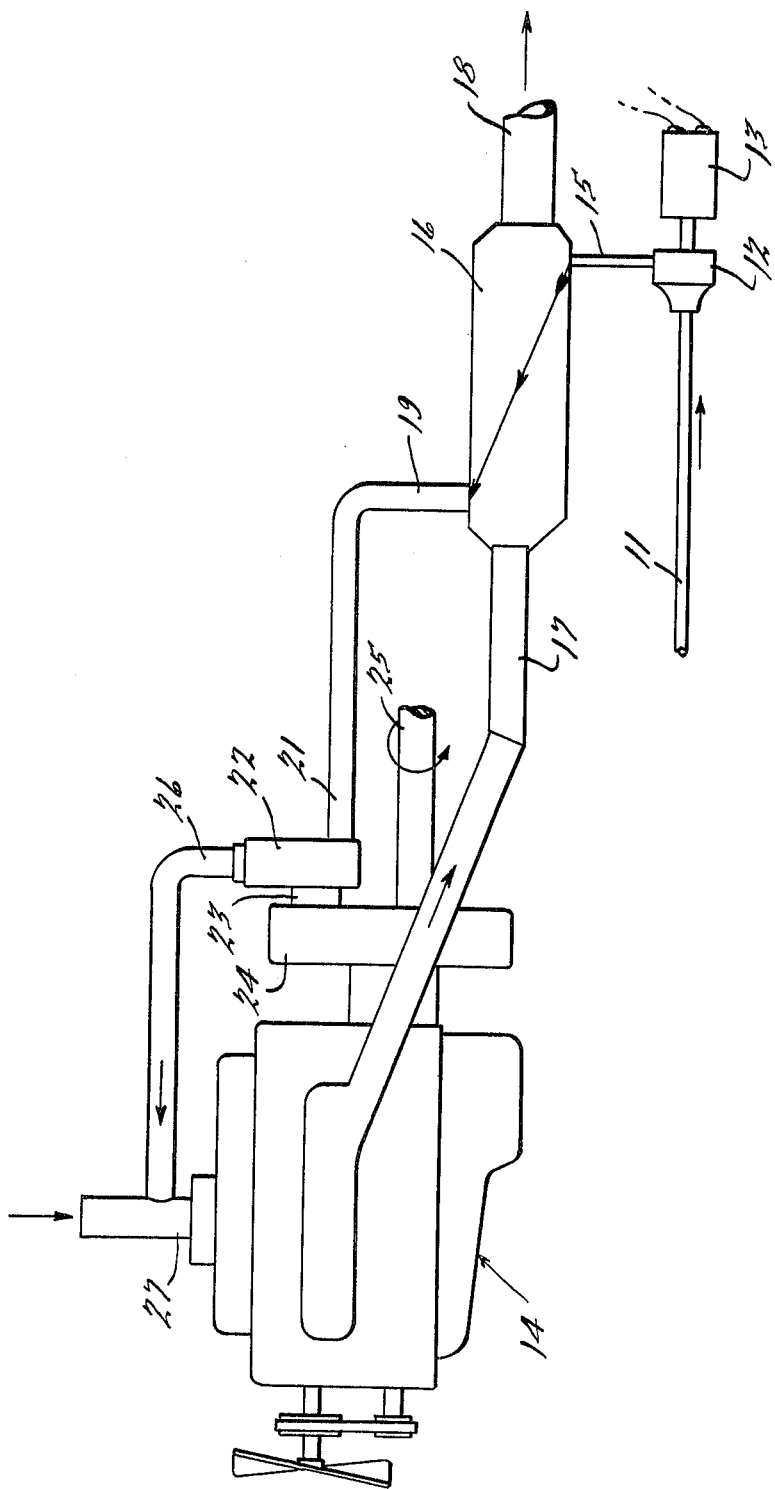

METHANOL FUELED SPARK IGNITION ENGINE

BACKGROUND OF THE INVENTION

1. Field of the Invention

The invention relates to spark ignition engines, and more particularly to the operation of said engines in a manner which will result in low emissions as well as higher thermal efficiency.

2. Description of the Prior Art

It is know to feed methanol to a reformer having a catalyst bed by means of a fuel pump which raises the pressure, and use the hydrogen created in the reformer, mixed with air, to run an internal combustion engine. The exhaust from this engine is used to heat the reformer.

It is also known to use reformers to form input gases for fuel cells from methanol.

BRIEF SUMMARY OF THE INVENTION

It is an object of the present invention to provide a novel and improved system for use of methanol in obtaining mechanical power, which utilizes to a greater extent the added energy created in the gases emitted from the reformer, thus increasing the thermal efficiency of the system.

It is another object to provide a novel and improved system of this character which would produce environmentally acceptable emissions having little oxides of nitrogen.

Briefly, the invention comprises a methanol supply line, a fuel pump in said line, a catalyst bed reformer connected to the outlet from said pump, the pump being capable of delivering said fuel at a relatively high pressure to the reformer, a spark ignition engine having an output shaft, an exhaust conduit leading from said spark ignition engine to said reformer whereby the pumped fuel will be heated and decomposed on the catalyst to form hydrogen and carbon dioxide, an auxiliary turbine having an output shaft coupled to the output shaft of said spark ignition engine, a conduit leading from the outlet of said reformer to the inlet of said auxiliary turbine whereby said carbon dioxide and hydrogen will be led to the turbine at an elevated temperature and pressure, an air inlet for said spark ignition engine, and means leading from the outlet of said auxiliary turbine to said air inlet whereby air will be mixed with said carbon dioxide and hydrogen and led to said spark ignition engine for combustion.

BRIEF DESCRIPTION OF THE DRAWINGS

The FIGURE is a partially diagrammatic view of the system of this invention.

DESCRIPTION OF THE PREFERRED EMBODIMENT

A methanol supply line is indicated at 11 and conducts methanol to a fuel pump 12. This fuel pump may be driven by a separate motor 13 or alternatively may be driven from the spark ignition engine generally indicated at 14. The methanol could for example be a mixture comprising $CH_3OH$ and $H_2O$. The flow rate could for example by 0.16 lbs. per second of $CH_3OH$ and 0.09 lbs. per second of $H_2O$, at 77° F. The power necessary to drive the fuel pump is relatively small, perhaps 0.8 horsepower.

The outlet conduit 15 of the fuel pump leads to a reformer 16. This reformer has a catalyst bed and is heated by the exhaust gases from spark ignition engine 14, being led through exhaust conduit 17. For example the exhaust gases could be delivered at 1400° F. and will be cooled in the reformer, leaving at perhaps 100° F. through exit conduit 18.

The methanol is delivered from the fuel pump through conduit 15 to the reformer at perhaps 300 psi. In the reformer the methanol is subjected to a heat absorption process and substantially constant pressure. That is, the methanol will be heated for example to 800° F. during which process it is vaporized, and is also decomposed by contact with the catalyst bed. The mixture of $CO_2$ and $H_2$ leaves exit conduit 19 of the reformer at perhaps 800° F. and 300 psi. The ratio of gases may be 25% $CO_2$ and 75% $H_2$. These gases are led to the inlet port 21 of an auxiliary turbine 22. This turbine has an output shaft 23 which is coupled through gearing 24 to the output shaft 25 of spark ignition engine 14. The turbine will thus aid in driving output shaft 25. In a typical installation the turbine could have 107 horsepower and the drive shaft deliver a total of 700 horsepower.

The gases leave exit 26 of the auxiliary gas turbine at a much lower pressure and temperature, for example 340° F. and 500 psi. These gases are delivered to the air inlet port 27 of spark ignition engine 14 and are mixed with the air. The fuel-air mixture is fed to the spark ignition engine and is used to drive this engine. The air could be delivered to the engine at 60° F. and at a rate of 1 lb. per second.

It is believed that while the basic thermal efficiency of a typical spark ignition engine is for example 37%, the overall thermal efficiency of the system of this invention would perhaps be 43%.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. In combination, a methanol supply line, a fuel pump in said line, a catalyst bed reformer connected to the outlet from said pump, the pump being capable of delivering said fuel at a relatively high pressure to the reformer, a spark ignition engine having an output shaft, an exhaust conduit leading from said spark ignition engine to said reformer whereby the pumped fuel will be heated and decomposed on the catalyst to form hydrogen and carbon dioxide, an auxiliary turbine having an output shaft coupled to the output shaft of said spark ignition engine, a conduit leading from the outlet of said reformer to the inlet of said auxiliary turbine whereby said carbon dioxide and hydrogen will be led to the turbine at an elevated temperature and pressure, an air inlet for said spark ignition engine, and means leading from the outlet of said auxiliary turbine to said air inlet whereby air will be mixed with said carbon dioxide and hydrogen and led to said spark ignition engine for combustion.

2. The combination according to claim 1, further provided with means for delivering said carbon dioxide and hydrogen to said turbine at a pressure substantially the same as that which is delivered to said reformer.

* * * * *